United States Patent
Yamin et al.

(10) Patent No.: US 12,523,320 B1
(45) Date of Patent: Jan. 13, 2026

(54) RATCHET CLAMP FOR PIPE COUPLING

(71) Applicant: Krausz Industries Ltd., Rosh HaAyin (IL)

(72) Inventors: Bar Yamin, Rosh Haayin (IL); Sergey Ryvzh, Rishon LeZion (IL)

(73) Assignee: Krausz Industries Ltd., Rosh HaAyin (IL)

( * ) Notice: Subject to any disclaimer, the term of this patent is extended or adjusted under 35 U.S.C. 154(b) by 0 days.

(21) Appl. No.: 18/818,903

(22) Filed: Aug. 29, 2024

(51) Int. Cl.
*F16L 21/06* (2006.01)
*F16L 33/08* (2006.01)
*F16L 33/207* (2006.01)

(52) U.S. Cl.
CPC ............. *F16L 21/06* (2013.01); *F16L 33/08* (2013.01); *F16L 33/085* (2013.01); *F16L 33/207* (2013.01)

(58) Field of Classification Search
CPC ....... F16L 33/08; F16L 33/085; F16L 33/207; F16L 33/2071; F16L 21/065; F16L 21/06
USPC .................................. 285/420, 419
See application file for complete search history.

(56) References Cited

U.S. PATENT DOCUMENTS

| | | | | |
|---|---|---|---|---|
| 2,408,347 A * | 9/1946 | Sprouse | ................... | F16L 33/08 24/274 R |
| 2,522,494 A * | 9/1950 | Baldo | ..................... | F16L 33/08 24/274 R |
| 4,546,524 A * | 10/1985 | Kreft | ....................... | F16L 33/02 24/274 WB |
| 4,643,465 A * | 2/1987 | Green | ................... | F16L 21/005 285/911 |
| 4,675,949 A * | 6/1987 | DaCosta | ................. | F16L 33/14 24/280 |
| 4,903,996 A * | 2/1990 | Herr | ....................... | F16L 33/12 285/39 |
| 5,232,250 A * | 8/1993 | Bonacci | .................. | F16L 33/08 285/236 |
| 5,661,876 A * | 9/1997 | Goldenberg | ............ | F16L 33/02 24/19 |
| 8,056,192 B1 * | 11/2011 | Posner | .................. | F16L 33/035 24/271 |
| 9,377,141 B2 * | 6/2016 | Andersen | ................ | F16L 33/10 |
| 12,127,747 B2 * | 10/2024 | Fostad Moe | ....... | A61B 17/1327 |
| 2006/0191113 A1 * | 8/2006 | Chin | ....................... | F16L 33/08 24/279 |

* cited by examiner

*Primary Examiner* — David Bochna
(74) *Attorney, Agent, or Firm* — Dekel Patent Ltd.; David Klein

(57) ABSTRACT

A pipe coupling includes a coupling band and an elastomeric seal disposed inside the coupling band, ratchet depressions formed on a portion of the coupling band, and a ratchet rod assembly mounted on another portion of the coupling band. The ratchet rod assembly includes a ratchet rod formed with ratchet teeth that interface with the ratchet depressions, such that rotation of the ratchet rod causes the ratchet teeth to progressively advance from one set of the ratchet depressions to another set of the ratchet depressions, which reduces an inner diameter of the elastomeric seal in the coupling band.

8 Claims, 4 Drawing Sheets

RATCHET CLAMP FOR PIPE COUPLING

FIELD OF THE INVENTION

The present invention relates generally to pipe couplings, and particularly to a pipe coupling with a single action ratchet mechanism for tightening the pipe coupling on a pipe.

BACKGROUND OF THE INVENTION

Many kinds of removable band-type couplings for pipes exist in the art. It is noted that throughout the specification and claims, the term "pipe" encompasses any kind of generally cylindrical object, and the terms "coupling" and "clamp" are used interchangeably.

Such couplings have an elastomeric seal assembly which is tightened to form a watertight seal against the pipe. In general, the pipe coupling includes two opposing clamp members and a set of bolts and nuts which are tightened by means of a wrench or other tool. The clamp members are tightened towards each other in a direction transverse to an axial length of the pipe coupling so as to apply a radially-inward clamping force on the pipe or pipes being clamped by the pipe coupling.

The clamp members generally extend a significant amount radially outwards from the pipe coupling. In certain situations, such as where the coupling is near a wall, ceiling or adjacent pipe, this poses a problem because there is not much room to access the bolts or nuts in order to tighten them.

SUMMARY

The present invention seeks to provide a pipe coupling with a single action ratchet mechanism for tightening the pipe coupling on a pipe, as described in detail below. The ratchet mechanism is easily tightened even in situations with little space left between the coupling and neighboring objects.

One embodiment of the invention uses a rod with ratchet teeth that interface with ratchet depressions formed on a portion of the coupling band. Rotating the ratchet rod causes the ratchet teeth to progressively advance from one set of ratchet depressions to another set of ratchet depressions, which reduces the inner diameter of the elastomeric seal in the coupling band to tighten it around the outer diameter of the pipe. In one version, the ratchet rod may be rotated from the side of the coupling by a cordless or pneumatic impact wrench or similar tool. In another version, which may be preferable in certain hard-to-reach areas, the ratchet rod may be rotated from the center of the coupling by means of a gear arrangement, as described below.

There is provided in accordance with a non-limiting embodiment of the invention a pipe coupling including a coupling band and an elastomeric seal disposed inside the coupling band, ratchet depressions formed on a portion of the coupling band, and a ratchet rod assembly mounted on another portion of the coupling band, the ratchet rod assembly including a ratchet rod formed with ratchet teeth that interface with the ratchet depressions, such that rotation of the ratchet rod causes the ratchet teeth to progressively advance from one set of the ratchet depressions to another set of the ratchet depressions, which reduces an inner diameter of the elastomeric seal in the coupling band.

In accordance with a non-limiting embodiment of the invention the ratchet teeth are formed on one or more sleeves that fit over a drive rod of the ratchet rod assembly.

In accordance with a non-limiting embodiment of the invention the sleeves are keyed with the drive rod so as not to slip or rotate with respect to the drive rod.

In accordance with a non-limiting embodiment of the invention the drive rod includes at least one end shaped to interface with a tightening tool configured to cause rotation of the ratchet rod.

In accordance with a non-limiting embodiment of the invention the ratchet rod assembly includes a base member and opposing side members.

In accordance with a non-limiting embodiment of the invention the portion of the coupling band with the ratchet depressions slides over the base member.

In accordance with a non-limiting embodiment of the invention a gear arrangement is located at a portion of the ratchet rod distanced from opposite ends of the ratchet rod, and rotation of gear arrangement causes rotation of the ratchet rod to cause the ratchet teeth to progressively advance from one set of the ratchet depressions to another set of the ratchet depressions, which reduces an inner diameter of the elastomeric seal in the coupling band.

In accordance with a non-limiting embodiment of the invention the ratchet teeth are formed on one or more sleeves that fit over a drive rod of the ratchet rod assembly, and wherein the gear arrangement includes a housing through which the drive rod is journaled, and a spur gear is mounted on the drive rod and a worm gear rod is journaled in the housing and meshes with the spur gear, the worm gear rod including at least one end shaped to interface with a tightening tool configured to cause rotation of the ratchet rod.

BRIEF DESCRIPTION OF DRAWINGS

The present invention will be understood and appreciated more fully from the following detailed description, taken in conjunction with the drawings in which.

DETAILED DESCRIPTION

Figure 1:
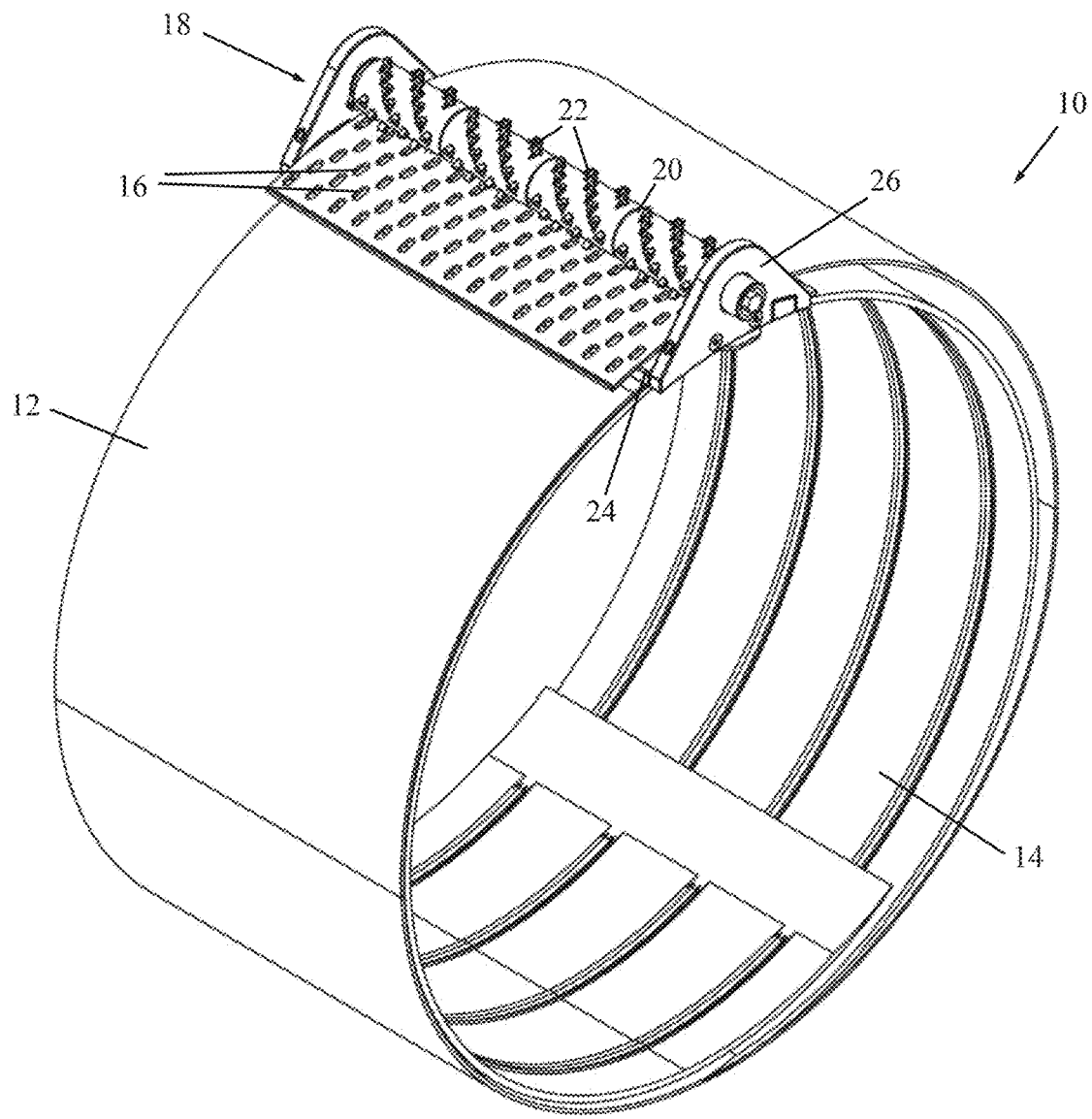
FIG. 1 is a simplified perspective illustration of a pipe coupling with a ratchet mechanism, in accordance with a non-limiting embodiment of the invention, in which the ratchet mechanism is tightened from the side of the coupling.

Reference is now made to FIG. 1, which illustrates a pipe coupling 10, in accordance with a non-limiting embodiment of the invention.

Pipe coupling 10 may include a coupling band 12, which without limitation, may be made of stainless steel or any other suitable material. An elastomeric seal 14 may be disposed inside coupling band 12.

One portion of the coupling band 12, typically but not necessarily at one end of the band 12, is formed with ratchet depressions 16. The ratchet depressions 16 may be formed all the way through the thickness of the band, or they may be blind, that is, they do not extend through the entire thickness of the band. The ratchet depressions 16 may be formed by any suitable process, such as but not limited to, punching, stamping, embossing, and others.

A ratchet rod assembly 18 may be mounted on another portion of the coupling band 12. The ratchet rod assembly 18 includes a ratchet rod 20 formed with ratchet teeth 22 that interface with ratchet depressions 16 formed on the coupling band 12. Rotating ratchet rod 20 causes ratchet teeth 22 to progressively advance from one set of ratchet depressions 16 to another set of ratchet depressions 16, which reduces the inner diameter of the elastomeric seal 14 in coupling band 12 to tighten it around the outer diameter of the pipe (not shown).

Figure 2A:
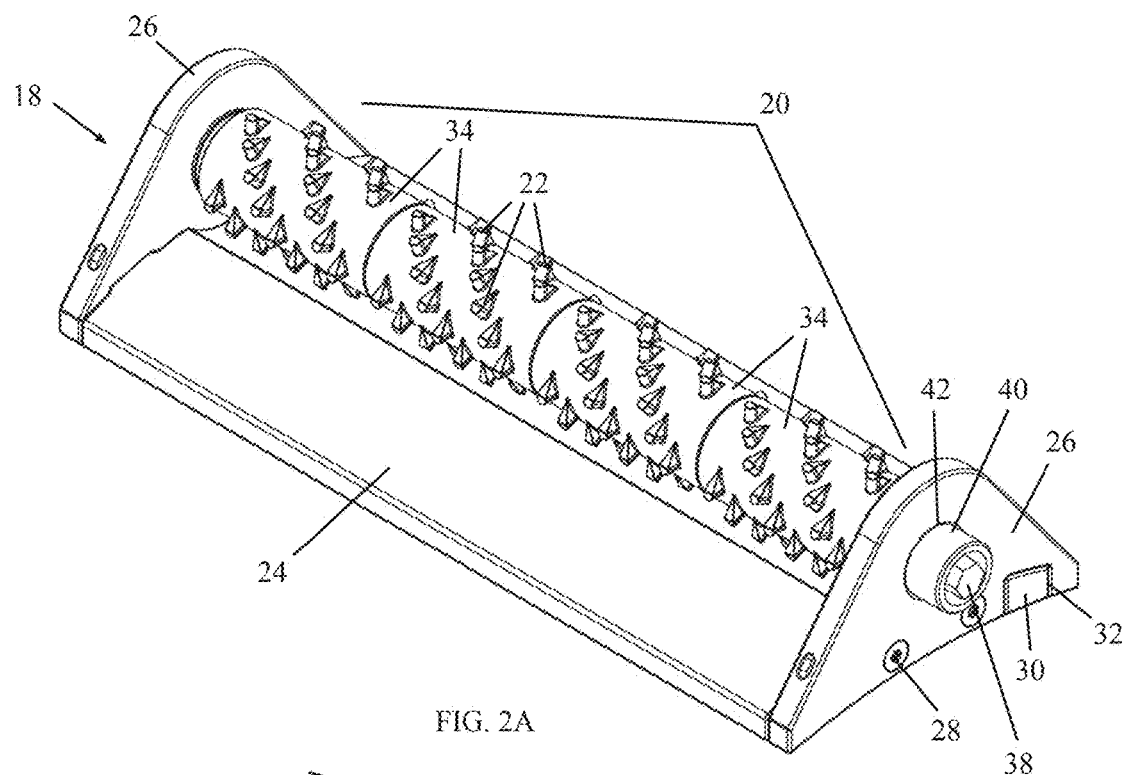
FIGS. 2A and 2B are simplified pictorial and exploded illustrations, respectively, of the ratchet mechanism of FIG. 1.
Figure 2B:
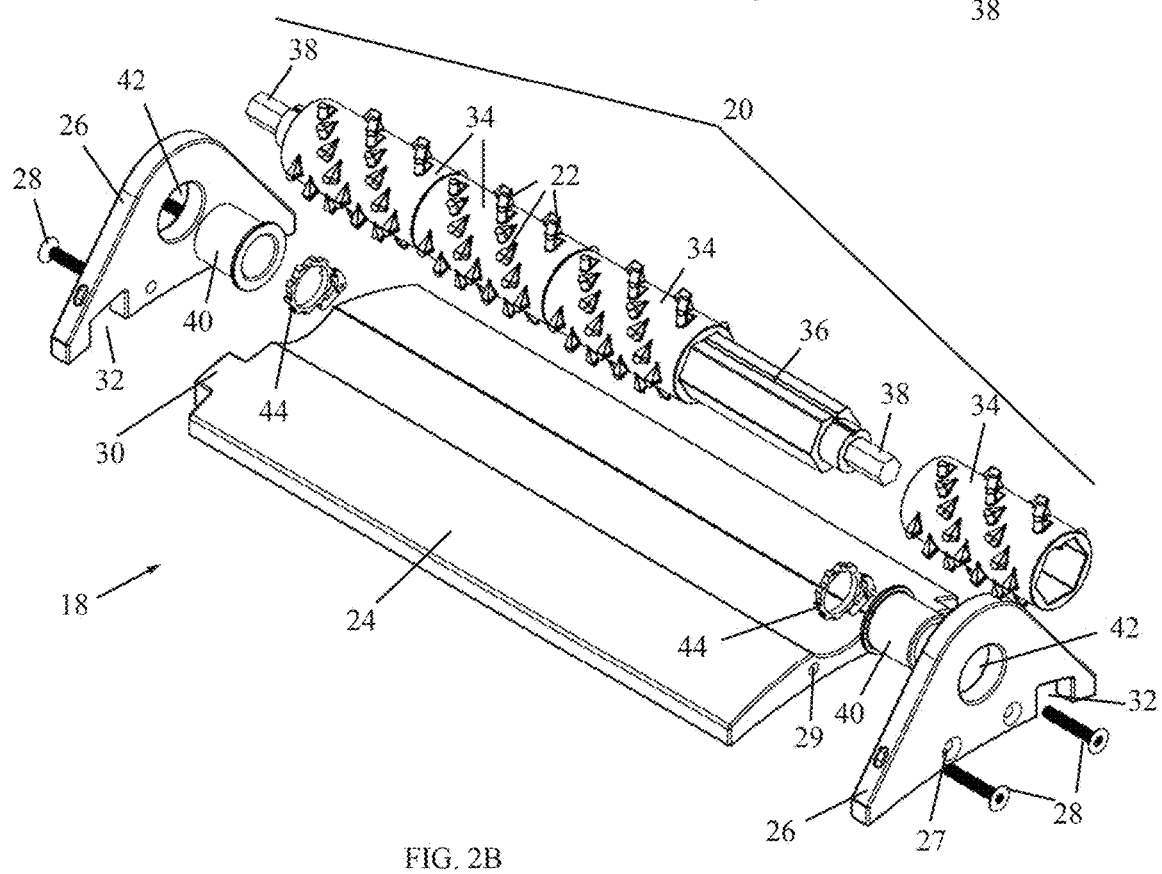

Reference is now made to FIGS. 2A and 2B, which illustrate the ratchet rod assembly 18 of FIG. 1.

The ratchet rod assembly 18 may include a base member 24 to which opposing side members 26 may be coupled by means of fasteners 28 that pass through holes 27 (FIG. 2B) in side member 26 and screw into threaded holes 29 (FIG. 2B) in base member 24. The base member 24 may be secured to the side members 26 with a keyed arrangement, such as a lug 30 that protrudes from base member 24 which is received in a notch 32 formed in the side member 26. The base member 24 may be secured to the coupling band 12 by any suitable means, such as but not limited to, welding, riveting or other mechanical fasteners.

The ratchet teeth 22 may be formed on one or more sleeves 34 that fit over an inner drive rod 36 (FIG. 2B). Sleeves 34 may be keyed with drive rod 36 so as not to slip or rotate with respect to the drive rod 36. For example, drive rod 36 may be hexagonal and mate with an internal hexagonal shape of the sleeve 34. Drive rod 36 may have an end or ends 38 shaped to interface with a tightening tool, such as a wrench. Accordingly, ends 38 may be hexagonal, without limitation. The tightening tool rotates drive rod 36 and ratchet rod 20 to cause ratchet teeth 22 to progressively advance from one set of ratchet depressions 16 to another set, as mentioned above.

The assembly of rod 20 (which includes sleeves 34 and drive rod 36) may be journaled (mounted for rotation) in bearings 40 (such as, but not limited to, a bushing, ball bearing, or other suitable bearing) mounted in a hole 42 in side member 26. A ratchet ring 44 (FIG. 2B) may be mounted at each end of drive rod 36.

Referring again to FIG. 1, it is noted that the portion of coupling band 12 with the ratchet depressions 16 slides over base member 24, which reduces the friction between the overlapped portions of the coupling band 12.

Figure 3:
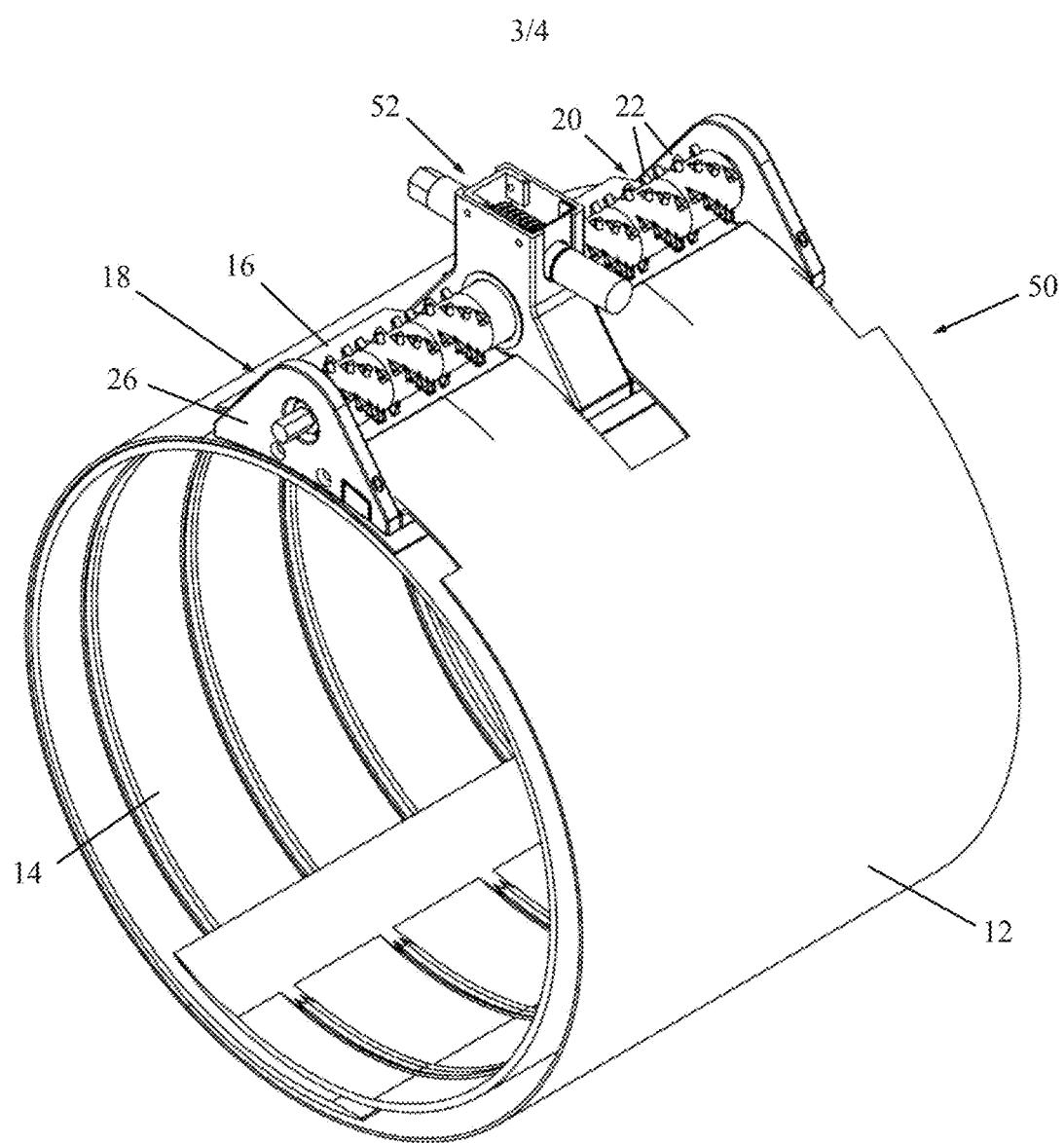
FIG. 3 is a simplified perspective illustration of a pipe coupling with a ratchet mechanism, in accordance with another non-limiting embodiment of the invention, in which the ratchet mechanism is tightened from the center of the coupling.

Reference is now made to FIG. 3, which illustrates a pipe coupling 50, in accordance with another non-limiting embodiment of the invention. Pipe coupling 50 is similar to pipe coupling 10, with like elements being designated by like reference numbers.

Figure 4A:
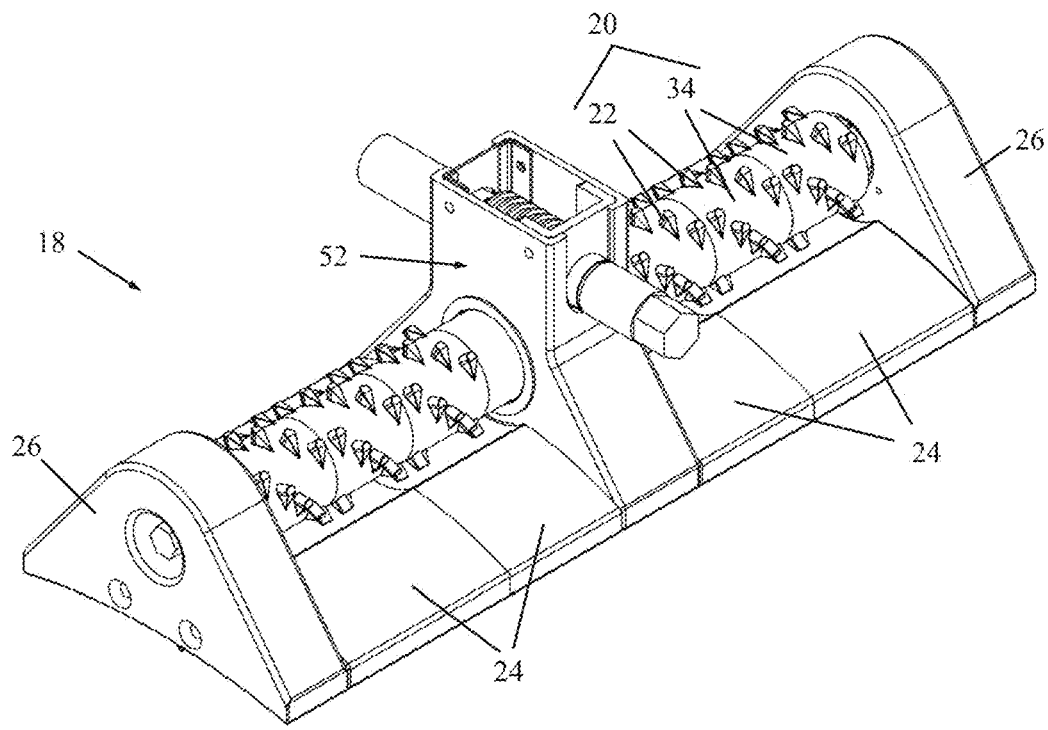
FIGS. 4A and 4B are simplified pictorial and exploded illustrations, respectively, of the ratchet mechanism of FIG. 3.
Figure 4B:
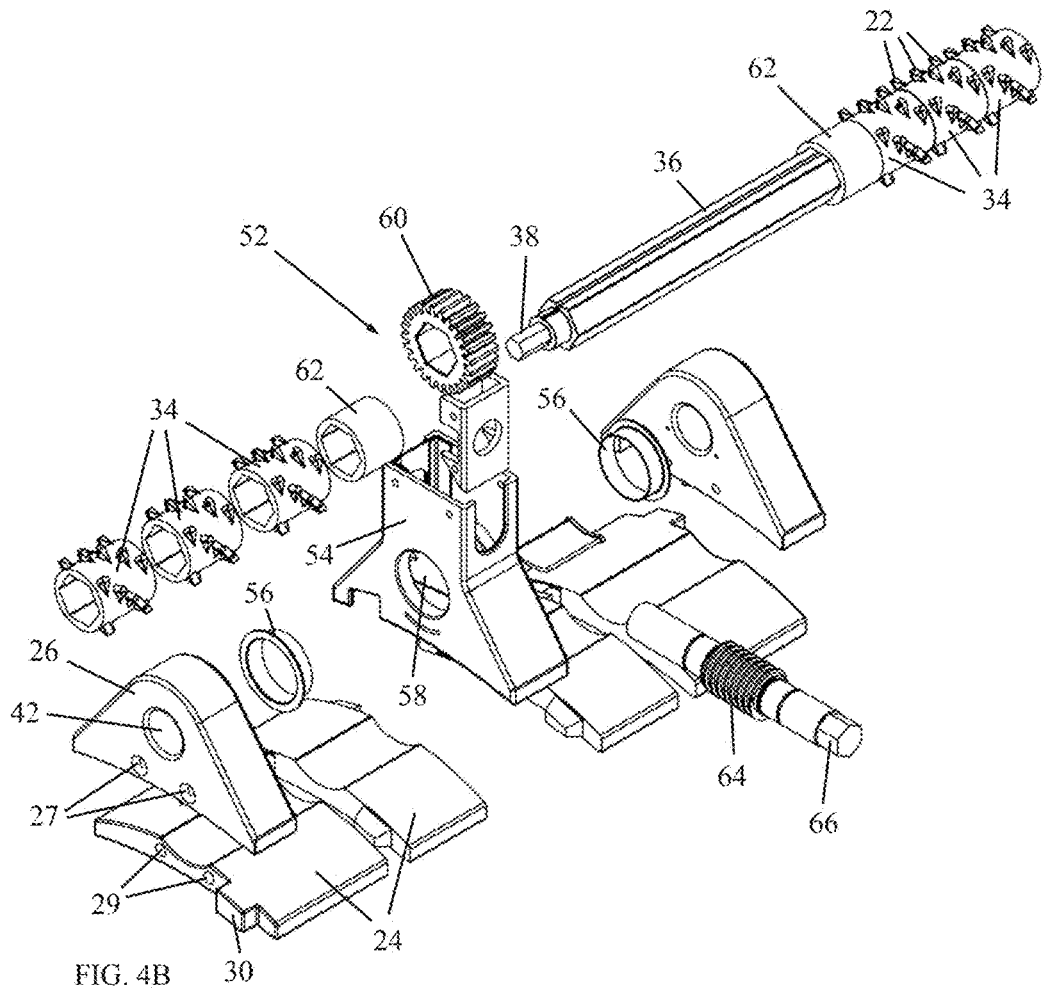

Pipe coupling 50 differs from pipe coupling 10 in that pipe coupling 50 includes a gear arrangement 52 located at a central portion of rod 20 of ratchet rod assembly 18. As seen in FIGS. 4A and 4B, the gear arrangement 52 may include a housing 54 through which drive rod 36 is journaled by means of bearings 56 (such as, but not limited to, a bushing, ball bearing, or other suitable bearing) mounted in holes 58 in housing 54. A spur gear 60 may be mounted on drive rod 36 and separated from sleeves 34 by means of spacers 62. A worm gear rod 64 is journaled in housing 54 and meshes with spur gear 60. Worm gear rod 64 may have an end or ends 66 shaped to interface with a tightening tool, such as an impact wrench. Accordingly, ends 66 may be hexagonal, without limitation. A tightening tool engages end 66 to rotate worm gear rod 64. The meshing of worm gear rod 64 with spur gear 60 transfers the rotation of worm gear rod 64, which is perpendicular to spur gear 60, to rotation of spur gear 60, thereby rotating drive rod 36 and ratchet rod 20 to cause ratchet teeth 22 to progressively advance from one set of ratchet depressions 16 to another set, as mentioned above.

Accordingly, in pipe coupling 50, the ratchet rod assembly 18 may be rotated from the center of the coupling by means of gear arrangement 52. This version may be preferable in certain hard-to-reach areas where the end of the drive rod is not easily accessible. Another advantage of pipe coupling 50 is that the central actuation provides more evenly distributed torque to the drive rod as opposed to the side actuation of pipe coupling 10.

What is claimed is:

1. A pipe coupling comprising:
   a coupling band and an elastomeric seal disposed inside said coupling band;
   ratchet depressions formed on a portion of said coupling band; and
   a ratchet rod assembly mounted on another portion of said coupling band, said ratchet rod assembly comprising a ratchet rod formed with ratchet teeth that interface with said ratchet depressions, such that rotation of said ratchet rod causes said ratchet teeth to progressively advance from one set of said ratchet depressions to another set of said ratchet depressions, which reduces an inner diameter of said elastomeric seal in said coupling band;
   wherein a gear arrangement is located at a portion of said ratchet rod distanced from opposite ends of said ratchet rod, and rotation of gear arrangement causes rotation of said ratchet rod to cause said ratchet teeth to progressively advance from one set of said ratchet depressions to another set of said ratchet depressions, which reduces an inner diameter of said elastomeric seal in said coupling band; and
   wherein said ratchet teeth are formed on one or more sleeves that fit over a drive rod of said ratchet rod assembly, and wherein said year arrangement comprises a housing through which said drive rod is journaled, and a spur gear is mounted on said drive rod and a worm gear rod is journaled in said housing and meshes with said spur gear, said worm gear rod comprising at least one end shaped to interface with a tightening tool configured to cause rotation of said ratchet rod.

2. The pipe coupling according to claim 1, wherein said ratchet teeth are formed on one or more sleeves that fit over a drive rod of said ratchet rod assembly.

3. The pipe coupling according to claim 2, wherein said sleeves are keyed with said drive rod so as not to slip or rotate with respect to said drive rod.

4. The pipe coupling according to claim 2, wherein said drive rod comprises at least one end shaped to interface with a tightening tool configured to cause rotation of said ratchet rod.

5. The pipe coupling according to claim 1, wherein said ratchet rod assembly comprises a base member and opposing side members.

6. The pipe coupling according to claim 5, wherein the portion of said coupling band with said ratchet depressions slides over said base member.

7. The pipe coupling according to claim 1, wherein said ratchet depressions are formed through an entire thickness of said coupling band.

8. The pipe coupling according to claim 1, wherein said ratchet depressions are not formed through an entire thickness of said coupling band.

* * * * *